United States Patent Office 3,323,974
Patented June 6, 1967

3,323,974
DECORATIVE LAMINATE OF SYNTHETIC
FABRIC ON POROUS SUBSTRATE
Werner L. Jablonski, James S. Gowing, and Russell S. Kenin, Midland, Mich., assignors to The Dow Chemical Company, Midland, Mich., a corporation of Delaware
No Drawing. Filed June 25, 1962, Ser. No. 205,077
5 Claims. (Cl. 161—82)

This invention relates to decorative laminae and, more particularly, to the preparation of laminated sheet material of fabric of thermoplastic microtapes, yarns, or partially flat filaments of various cross sections formed of strips of foil made from certain normally crystalline, organic, thermoplastic polymer latexes adhered to certain types of adhesive-coated porous substrata.

The decorative laminae of the invention can be used as upholstery, as coverings for structural metal, plastic, wood, and the like substrates employed in manufacturing luggages, as coverings for cabinets, cases, floors, ceilings, card table tops, lamps, such as shades and lamp bases, accordian folding partitions (e.g., doors, curtains, etc.), head-liners and side panel coverings in vehicles (e.g., automobiles, airplanes, boats, etc.) and the like. The decorative laminae of the invention, however, are particularly designed and constructed so that they can be satisfactorily applied as a generally permanent, flat surface covering and preferably a wall covering which: (1) utilizes a light weight, porous, comparatively loosely woven, substantially fireproof, synthetic, textile fabric for decorative wall and other flat surface coverings; (2) provides moistureproof sheet materials free of discoloration due to excessive secretion of naturally dark colored adhesives through the woven, synthetic, textile fabrics; (3) provides composite sheetings in which substantially the initial dimensions of the woven fabrics can be maintained during the manufacturing of the laminated sheeting; (4) provides composite, laminated sheetings constructed in part of a non-raveling, comparatively loosely woven, synthetic, textile fabric; (5) provides composite sheeting products having a suitable amount of rigidity to afford ease of handling; (6) provides composite sheeting products having highly satisfactory covering and concealing characteristics; (7) provides a widely diversified selection of attractive composite sheeting materials having a broad range of solid background colors and varied patterned background colors obtained by means of variously colored porous substrata and/or differently colored pigmented adhesive bonding agents; (8) provides substantially fireproof, composite sheeting materials that can be applied very simply and with considerable ease for any given end use; and (9) provides valuable, composite covering materials, the application of which substantially eliminates the necessity of incurring frequent replacement inconvenience and expense.

Prior to this invention, materials employed for the aforementioned purposes have usually been embossed materials of vinyl thermoplastic coated paper or cotton scrim fabric. In some applications, burlap type or hessian cloth fabrics have been utilized in the same manner. However, burlap-type coverings and cotton scrim fabric coverings have the disadvantage of being difficult to clean and require frequent replacement. The burlap and cotton scrim fabric coverings, also, have a dissatisfactory tendency of showing discoloration from the adhesive binding agents employed. This discoloration necessitated additional coating or painting of these materials after installation. In addition, these fabrics tend to ravel and shrink in the preparation of coverings of these fabrics. In contrast, vinyl coated paper covering materials tend to lack the body or rigidity which is most desirable for ease of application. Vinyl coated paper coverings generally do not possess a sufficient amount of covering or concealing power which is ordinarily desirable in the majority of the presently intended applications within the scope of the invention. Also, vinyl coated paper coverings, due to their difference in construction as compared with the laminated sheeting materials of the invention, lack the variation in aesthetic characteristics, such as variation in effects obtainable by means of changes in color of the porous substrata versus changes in construction of the fabric pattern or weave and changes in color pigmentation of the adhesive bonding agent.

Consequently, although coverings of vinyl coated paper, cotton scrim fabrics, and burlap-type fabrics have been employed in application similar to those within the scope of the invention, those coverings have not been entirely satisfactory for many applications nor do they achieve the same attractive and unusual decorative effects which are obtainable by employing the laminated sheeting materials of the present invention.

With the above-defined areas for improvement in mind, it would be desirable to have and it is the principal object of this invention to provide novel, decorative, laminated sheet materials of woven fabric constructed of thermoplastic, filamentary microtapes of various cross sections formed of strips of foil made from normally crystalline, organic, thermoplastic, polymeric materials adhered to certain porous substrates by means of certain aqeous, organic, thermoplastic, adhesive compositions.

It is a further object of the invention to provide a method for producing the novel, decorative laminae to be employed in the wide variety of applications previously described.

It is another object of the invention to provide novel decorative laminated sheet materials having all of the advantageous and improved characteristics defined heretofore.

The above and related objects are achieved by means of the process wherein the solids of an aqueous, latex-based, adhesive composition of a moistureproof, organic, thermoplastic material are deposited on a flexible, porous substratum (i.e., cellulosic material); the coated substratum dried; the coated substratum and the desired type of flexible, porous, woven fabric web constructed of organic, thermoplastic, microtape yarns of various cross sections formed of strips of foil made from normally crystalline, organic, thermoplastic, polymeric latexes to be adhered to said substratum being continuously and progressively brought into compressive pressure relationship at an elevated temperature known to cause fusion of said organic, thermoplastic material for a brief period of time. The invention, likewise, contemplates, as a new and useful article of manufacture, the decorative, laminated sheeting material so prepared.

The operable, aqueous, water-insoluble, polymeric, latex materials used in various adhesive compositions employed in the practice of the present invention may be selected from any organic, thermoplastic, polymeric material which has a softening point or fusion temperature which is below that at which the desired filamentary microtape yarn substratum and flexible web backing are distorted or degraded. In most instances, this temperature is advantageously below about 392° F., although, when the component materials are chosen with care, higher temperatures may be employed. It is preferred that polymeric materials having fusion temperatures of below about 330° F. be employed.

Typical of the operable polymeric latexes and representing a preferred species are the copolymers of acrylonitrile and vinylidene chloride composed of a predominant amount of over 50 percent by weight of vinylidene chloride. Such copolymeric latexes exhibit good adherence to the substrata contemplated herein, have satisfactory heat and light stability, and are readily available. Other copolymers of either vinylidene chloride or vinyl chloride with another monoethylenically unsaturated comonomer, such as vinyl acetate, vinyl propionate, methyl acrylate, ethyl acrylate, 2-ethylhexyl acrylate, cyclohexyl acrylate, as well as other alkyl and cycloalkyl acrylates; methyl methacrylate, and other alkyl methacrylates containing up to about 8 carbon atoms in the alkyl group; acrylic and methacrylic acid; alkyl vinyl ethers, such as ethyl vinyl ether, and substituted alkyl vinyl ethers, such as 2-chloroethyl vinyl ether; chloropropene; and 2-methyl propene. Also included are ternary and quaternary polymers based upon vinyl chloride and/or vinylidene chloride.

Still further examples of useful polymeric materials for inclusion in the latex-based adhesives employed in the invention are the polymers and copolymers of the alkyl and cycloalkyl acrylates and the alkyl and cycloalkyl methacrylates. These include the copolymers and interpolymers of such acrylic esters with one another or with one or more different monoethylenically unsaturated compounds, such as those listed above. Other examples include the polymers and copolymers of monoalkenyl aromatic monomers, containing from 8 to about 12 carbon atoms, such as styrene, para-methylstyrene, meta-ethylstyrene, ortho-, para-dimethylstyrene, para-chlorostyrene, isopropylstyrene, ortho-methyl-para-isopropylstyrene, and ortho,para-dichlorostyrene, and also those materials resulting from the copolymerization of styrene with alpha-methylstyrene or with one or more of the above-named monoalkenyl aromatic monomers. Also contemplated are the themoplastic copolymerizates of styrene or of the other monoalkenyl monomers with other monoethylenically unsaturated monomers, including acrylonitrile, alkyl and cycloalkyl acrylates, and the others lister supra.

Among still other useful polymeric materials may be mentioned the copolymers of conjugated diolefins, such as butadiene, with monoethylenically unsaturated monomers, such as acrylonitrile, styrene, or the others previously mentioned.

The above-mentioned species are intended to only illustrate the operable, thermoplastic, latex materials suitable for use as the major component of the adhesive compositions employed in the practice of the invention. Many other combinations will be readily apparent to the skilled worker. All of the above-indicated materials are capable of easy operability within a suitable coating process. Other materials, exemplified by the polyamides, polytetrafluoroethylene, and polychlorotrifluoroethylene, are operable only with extreme difficulty, due to the problems of obtaining such materials in the form of a latex and particularly due to their extremely high fusion temperatures which, is some instances, may be above the practical operational capacity for existing equipment and above the temperatures which may be tolerated by the flexible web and substratum.

Latexes of many of th eabove-described polymeric materials are available commercially. Any that are not may be readily and conveniently prepared in accordance with well known emulsion polymerization techniques and principles. In a typical preparation, the monomeric materials are dispersed into an aqueous phase containing a small amount of a water-soluble, free-radical polymerization catalyst, such as potassium persulfate, hydrogen peroxide, or the like, and a small concentration of an emulsifier for the particular monomeric materials being polymerized. Those emulsifiers will be known or judicious selection of them can be easily made after simple preliminary experiment. The aqueous dispersion of monomers is caused to polymerize under thermal and catalytic inducement until substantially all of the monomers have been converted to polymer. The latex is then filtered to remove any precoagulum and post-stabilized, if necessary or desired, by the incorporation therein of small amounts of additional wetting agents. Such latexes may be prepared in either batchwise operations or in a continuous manner. As is known, improved compositional homogeneity usually results when the monomers are added continuously or intermittently to the polymerizing system according to a prearranged schedule based on their relative reactivity.

Although successful operability of the process is independent of the polymer solids content, it has been found to be advantageous to employ latexes having from about 10 to about 50 percent by weight of polymer solids. It is preferred to use those containing from about 25 to about 50 percent by weight of polymer solids. When the latex contains appreciably less than 10 percent solids, the deposit of polymer on the flexible web from a single application is frequently found to be inadequate for achieving the desired coating thickness. The consequence is that the web must usually be exposed repetitively to the latex to achieve adequate polymer deposit thereon. Latexes having appreciably more than about 50 percent by weight of solids are difficult to prepare. In addition, they are extremely sensitive to mechanical shear and, upon prolonged storage, may tend to coagulate permaturely.

Additives are commonly incorporated into polymer formulations for specific functions. Typical of these additives are latex thickeners and stabilizers, and light and heat stabilizers for the polymer. Pigments and dyes may be added, if desired, as may fillers and reasonably large amounts of certain water-soluble monovalent metal salts known to impart fire-retardant properties to latex adhesive compositions. Upwards of 30 parts of the following water-soluble monovalent metal salts can be dissolved in 100 parts of aqueous organic thermoplastic latex to contribute fire retardance thereto. Metal salts in this group include tetrasodium pyrophosphate, ammonium acid phosphate, potassium dichromate, sodium nitrite and the like. In addition, some polymers require plasticizers for best fusion characteristics. Any of the above additives may be used in this process, provided that they are compatible with and capable of substantially uniform distribution throughout the latex.

Accordingly, aqueous, latex-based, adhesive compositions employed in the invention may comprise known filler agents which thicken and improve the spreading characteristics of the latex on the flexible, porous substrata. Suitable water-soluble and water-dispersible fillers for this purpose include methyl cellulose, methyl hydroxypropyl cellulose, hydroxyethyl cellulose, and other similarly employed cellulose ethers having a viscosity of from about 4,000 to about 15,000 centipoises, ammonia-solubilized casein, sodium caseinate, wheat flour, soybean-α-protein, soybean flour, obtained as "Casco W1691," corn starch, cationic starch, dextran, and the like and, particularly, ammonium polyacrylate, obtained as "Acrysol GS." These thickening agents may be employed in an amount of from about .25 to about 10.0 weight percent as based on the latex solids content of the adhesive composition.

In like manner, some aqueous, latex-based, adhesive compositions finding application in the invention may also contain at least one extender pigment which can be incorporated in the adhesive to act as an antiblocking agent to assure satisfactory storage life of the dried adhesive coated web substrates on rolls without adherence to contacted portions of the uncoated web substrate. For this purpose, antiblocking agents, optionally, may be combined therein in amounts corresponding to a ratio of from about 1:1 to 0.5:1 part of filler pigment per part of adhesive solids. Various inert extender pigments may be effectively employed as antiblocking agents in the instant, latex-based, adhesive compositions including talc, mica, calcium carbonate, barytes, and the like, and particularly wilkinite-type and bentonite-type clays. All are useful in appropriately small particle sizes, such as in the order of about 325 mesh particle sizes, as specified by the U.S. Standard Sieve Series. If preferred, certain of these antiblocking agents, such as talc, clay and the like, may be advantageously dusted on the dried surface of the adhesive coated web substratum before the web is wound on storage rolls.

Most satisfactory compatible plasticizers that optionally may be incorporated in the presently employed adhesive compositions are butyl glycolate; triethylene glycol di-2-ethyl butyrate; phosphates, such as tricresyl phosphate, triphenyl phosphate, and monocresyl diphenyl phosphate; phthalic plasticizers, such as dimethyl phthalate, dibutyl phthalate, diamyl phthalate, diphenyl phthalate, dimethoxy glycol phthalate, dibutoxy glycol phthalate, methyl phthalyl methyl glycolate and butyl phthalyl butyl glycolate. The above-indicated plasticizers serve for best results, while other compatible plasticizers may be used, where desirable, with varying degrees of success. These plasticizers are effectively employed in the instant, latex-based, adhesive compositions in amounts from about 5 to about 50, and preferably from about 10 to about 40, weight percent of the combined weight of the latex binder component.

Outstandingly effective in their performance as aqueous, organic, thermoplastic, latex-based, adhesive compositions for use in the preparation of the decorative laminated sheeting materials of the invention are: (1) a vinylidene chloride-containing adhesive composition comprised of an aqueous latex dispersion containing about 50 weight percent latex solids of an organic, thermoplastic interpolymer composed of about 85 weight percent of vinylidene chloride and about 15 weight percent of acrylonitrile; said vinylidene chloride latex dispersion having incorporated therein about 20 weight percent of dibutyl phthalate and from about 0.25 to about 10 weight percent of a thickening agent per weight percentage of latex solids; (2) an acrylic-containing adhesive composition comprised of an aqueous latex dispersion containing about 47 weight percent latex solids of an organic, thermoplastic, interpolymer composed of about 65 weight percent of ethyl acrylate, about 32 weight percent of methyl methacrylate, about 1.0 weight percent of acrylic acid, and about 1.0 weight percent of methacrylic acid; said acrylic latex dispersion having incorporated therein from about 0.25 to about 10 weight percent of a thickening agent for each weight percentage of latex solids; and (3) another acrylic latex-containing adhesive composed of an aqueous later dispersion containing about 40 weight percent latex solids of an organic, thermoplastic interpolymer, obtained as "Rhoplex E-23," said acrylic latex-containing adhesive having incorporated therein from about 0.25 to about 10 weight percent of a thickening agent per weight percentage of latex solids.

Various flexible, substantially opaque, porous materials may be employed as the supporting or backing substrata of the decorative, laminated sheet materials of the invention. Effective backing substrata may include woven fabrics having solid colors and/or printed color patterns, such as light weight canvas, denim (i.e., twill, basket and satin weaves), duck, cotton knit constructions, cotton scrim, grass cloth, woven felt, and the like, as well as non-woven fabrics, such as pressed or corded felt, felts containing man-made protein fibers and/or other synthetic fibers. In addition to the aforementioned supporting or backing fabric substrata, preferred types of flexible, porous substrata comprise white; color-printed on white background; solid colored; and color-printed on solid-colored background paper in weights of from about 10 to about 50, and preferably hanging grade paper of more than 30 pounds per ream as is based on the weight in pounds of a stack of 500 paper sheets having dimensions of 24 by 36 inches. Paper sheeting of suitable weight to provide sufficient opacity to hide imperfections on the surfaces of the base materials over which they are ultimately intended for application is most advantageously employed.

The synthetic textile fabrics employed to prepare the laminated decorative sheet material of the invention are woven fabrics formed of twisted or non-twisted, organic, thermoplastic, filamentary microtapes (i.e., partially flat filaments of various cross-sectional configurations).

The filamentary microtapes useful in the preparation of woven fabrics for instant purposes may be of any organic, thermoplastic, resinous material. As materials which may be advantageously used are the normally crystalline polymeric materials. These are the polymers which have a tendency to form crystallites or sites where small segments of a plurality of the polymer chains are oriented and held in position by secondary valence forces. This crystallite formation or crystallinity is usually visible when the polymers are examined by X-ray diffraction. Typical of the normally crystalline polymeric materials falling within the advantageous definition are the polymers and copolymers of at least 70 percent by weight of vinylidene chloride with any remainder composed of one or more other monoethylenically unsaturated comonomers exemplary of which are vinyl chloride, vinyl acetate, vinyl propionate, acrylonitrile, alkyl and aralkyl acrylates having alkyl and aralkyl groups of up to about 8 carbon atoms, acrylic acid, acrylamide, vinyl alkyl ethers, vinyl alkyl ketones, acrolein, allyl esters and ethers, butadiene and chloroprene. Known ternary compositions also may be employed advantageously. Representative of such polymers are those composed of at least 70 percent by weight of vinylidene chloride with the remainder made up of, for example, acrolein and vinyl chloride, acrylic acid and acrylonitrile, alkyl acrylates and alkyl methacrylates, acrylonitrile and butadiene, acrylonitrile and itaconic acid, acrylonitrile and vinyl acetate, vinyl propionate or vinyl chloride, allyl esters or ethers and vinyl chloride, butadiene and vinyl acetate, vinyl propionate or vinyl chloride, and vinyl ethers and vinyl chloride. Quaternary polymers of similar monomeric composition will also be known. It has been found that the normally crystalline copolymers composed of from about 92 to 99 percent by weight of vinylidene chloride and correspondingly from 8 to 1 percent by weight of acrylonitrile or of a lower alkyl acrylate have suitable polymerization characteristics resulting in exceptionally useful filamentary articles that are well adapted for use in the construction of a variety of woven fabrics employed in producing the novel decorative laminae of the invention. For these reasons these vinylidene chloride-acrylonitrile and vinylidene chloride-lower alkyl acrylate copolymers represent preferred species for use herein.

It should be understood, however, that the synthetic textile fabrics employed in the production of the decorative laminae of the invention are not limited to the use of filamentary microtapes and ribbons of normally crystalline polymers but that those formed from any non-elastic, polymeric material may be used. There are many materials, such as polyvinyl chloride and polystyrene, which are capable of forming continuous, coherent articles which are orientable but do not normally from crystallites. The polymeric materials, whether crystalline or non-crystalline, may also include minor amounts of monomers, such as vinyl pyrrolidone, vinyl oxazolidinone, vinyl alkyl oxazolidinone, and the like, which are known to aid the dye-receptivity and other properties of fibrous materials. Likewise, it is possible for the polymers to contain interpolymerized light and heat stabilizers.

Also operable in the present method are fabrics constructed of twisted and untwisted filamentary microtapes and ribbons of polymeric materials, such as the polyolefins, including, for example, polyethylene, polypropylene, copolymers of ethylene and propylene, and polyisobutylene. Equally useful in the method are the fabrics constructed of filamentary microtapes and ribbons formed from condensation polymers, such as the polyamides, including polyhexamethylene, diadipamide, and the polyesters, including polyethyleneterephthalate. Also of utility are the fabrics of filamentary microtapes and ribbons of rubber hydrochloride and thermoplastic synthetic cellulose derivatives, including cellulose esters, such as cellulose acetate and cellulose ethers, such as methyl cellulose and hydroxypropyl methyl cellulose. It should be apparent that any organic, thermoplastic, resinous material which is capable of being formed into a flat filament or ribbon of various cross-sectional configurations will find utility in the construction of woven fabrics employed in the present invention.

Methods for producing normally crystalline polymeric materials of utility in the woven fabrics used to provide the novel decorative laminae of the invention are many and varied as available in the polymer art. In like manner, a variety of processes are known in the art which teach various methods of shaping films and foils of normally crystalline polymeric materials into filaments suitable for use in the construction of woven synthetic textitle fabrics. However, the light weight, flexible, moistureproof, porous, thermoplastic, woven fabrics of prime utility in the preparation of the novel decorative laminae of the invention are those fabrics constructed of thermoplastic filamentary microtapes of various cross-sectional configurations which are formed of strips of foil prepared from electrolyte-coagulatable, organic, thermoplastic, copolymer latexes containing from about 30 to about 50, and preferably from about 30 to 40, percent by weight of non-volatile solids. The latexes which are useful in preparing the instant thermoplastic tapes are those of normally crystalline vinylidene chloride polymers, and particularly those copolymers composed predominantly of vinylidene chloride and also containing from about 1 to 8 weight percent of acrylonitrile of lower alkyl acrylates. The process for preparing one of the preferred types of thermoplastic monofilamentary microtapes capable of being shaped into various cross-sectional configurations is described in detail in U.S. 2,960,725, issued Nov. 22, 1960 to Lloyd E. Lefevre. In that patent is described the instant process which comprises as essential sequential steps the localized coagulation of a film-forming polymer latex of a normally crystalline polymer into a flat, continuous, coherent, porous coagulum, washing said coagulum free of coagulant, drying said coagulum below its fusion temperature, and finally subjecting the flat, continuous, coherent, porous coagulum to heat directed at one side of the ribbon to fuse together or to coalesce the particles of the coagulum and simultaneously to roll the edges of the ribbon without causing fusion together of the layers.

Processes for preparing other preferred types of filamentary microtapes having various labyrinthian cross-sectional configurations are described in detail in copending application for U.S. Letters Patent having the common filing date of May 19, 1960, and identified, respectively, as Ser. No. 30,247 by Fred A. Phillips; Ser. No. 30,249 by Floyd E. Romesberg, Gerald M. Hart and Lloyd E. Lefevre; and Ser. No. 30,250 by Lloyd E. Lefevre, Robert J. Mathieson and Floyd E. Romesberg, all abandoned. In brief, these patent applications detail three different processes for preparing filamentary microtapes of labyrinthian cross section. Ser. No. 30,247 describes a process which comprises the passing of an unfused, continuous, coherent tape or ribbon of an organic, thermoplastic, resinous material through heated restricting means of narrower width than the width of said tape or ribbon to fuse the tape or ribbon essentially simultaneously with the shaping of the microtape followed by orientation of the fused microtape. Ser. No. 30,249 describes a second process which comprises the passing of a fused, unoriented ribbon of an organic, thermoplastic, resinous material through restricting means of narrower width than the width of said ribbon while maintaining said ribbon under sufficient tension to cause orientation essentially simultaneously with the shaping of the microtape. Ser. No. 30,250 describes a third process which comprises the passing of an unoriented, flat ribbon of an organic, thermoplastic, resinous material through stationary restricting means of narrower width than said ribbon followed by orienting the so-shaped microtape.

The useful filamentary microtapes used in the construction of fabric suitable for employment in the present method are prepared from flexible tapes or ribbons usually of about 0.001 to 0.005 inch in thickness and of about 0.1 to 1 inch in width. The thickness and width of the tape or ribbon to be used in preparing the microtapes will in some measure affect or determine the denier, thickness, and width of the resulting microtape. The fabric construction desired for the novel decorative laminae of the invention will generally dictate the microtape structure to be used in any given instance. The above dimensional limits are those which would normally be associated with the manufacture of filamentary microtapes to be use in conventional textile fabrics. When it is desired to make filamentary microtapes of greater size than, for example, about 0.3 inch, it would usually be found desirable to employ other known fabrication means, such as thermal extrusion for their preparation. Wide sections of tape which are more accurately referred to as films are not handled conveniently in the present procedural steps. However, it should be understood that the processes described immediately above are not limited precisely to the 1-inch maximum, since useful microtapes may be prepared herefrom, although with less control of width than with the narrower filamentary microtapes.

Further, a highly satisfactory process for twisting ribbon or generally tape-like strips of the presently preferred type of flat, normally crystalline vinylidene chloride copolymer films or foils into relatively cylindrical and commercially acceptable yarn-like monofilamentary products is adequately disclosed in U.S. 2,918,784, issued Dec. 29, 1959 to Charles Raymond Faircloth. Briefly, the twisting process comprises, in its most essential form, subjecting a flat film strip of normally crystalline vinylidene chloride copolymer to heat at a temperature between about 120° and 145° C., preferably between about 125° and 140° C., and advantageously by flat contact of the ribbon-like film strip upon a heated surface for a practically instantaneous period of time between about 0.003 and 0.05 second; then immediately thereafter spirally Z- or S-twisting said film strip into a yarn-like, monofilamentary product, while taking up said twisted product in a collecting package therefor as in and with a conventional textile twist-imposing apparatus, such as ring- or cap-twisting device that is adapted to impose at least one turn per inch in the strip.

Employing the film-strip twisting process of Faircloth, yarn-like monofilaments having between about two (2) and thirty (30) turns per inch will have a denier range between about fifty (50) and two thousand (2,000) in twist multiplier relationships of from about one-half (0.5) to eight (8). The twist is uniformly inserted in the film strips and is substantially permanently set therein. The yarn-like monofilaments, so formed, are easily and readily converted into a wide variety of textile cloth and fabric constructions. Any of the several techniques that are available can be utilized for such purpose, using conventional yarn handling procedures for and upon either the twisted or non-twisted film strip product.

In the weaving of fabrics of the twisted and/or non-twisted filamentary microtapes, a wide variety of fabric constructions are attained by employing the basic principles of filament weaving on both single and multi-shuttle automatic looms. The microtape is used as warp and filling in 100 percent and combination fabrics. Typical fabric constructions provided with these microtapes for the application in point are listed in the following Table I:

TABLE I.—100% MICROTAPE YARN FABRIC CONSTRUCTIONS

| Greige Count | Weave | Ounces/ yd.² | Warp Yarn (Denier) | Filling Yarn (Denier) |
|---|---|---|---|---|
| 54 x 36 | Plain | 6.83 | 550 | 550 |
| 62 x 48 | Basket | 8.44 | 550 | 550 |
| 76 x 43 | Plain | 6.50 | 300 | 550 |
| 56 x 44 | do | 5.58 | 300 | 400 |
| 80 x 44 | do | 5.18 | 300 | 300 |
| 10 x 12 | do | 1.15 | 400 | 400 |
| 26 x 20 | Leno | 2.52 | 400 | 400 |
| 62 x 28 | Plain | 11.59 | ¹ 400 | ¹ 400 |
| 64 x 35 | 2/2 Twill | 13.0 | ¹ 400 | ¹ 400 |
| 32 x 32 | Plain | 3.5 | 400 | 400 |

¹ 2 ply.

Combination fabrics woven of the microtape yarns employed as either the warp or fill with other natural and synthetic textile yarns, such as rayon, 6/1 Saran/Viscose, cotton, and the like, being used as the alternate yarn, likewise find application in the laminated decorative sheeting materials of the invention. In addition, fabrics knitted of filamentary microtape yarns also find effective utility in preparation of the laminated decorative sheeting materials of the invention.

The filamentary microtape yarn fabrics used in this invention are available in natural, white, and a variety of vivid solution-dyed colors exhibiting excellent color fastness properties. Precolored microtape yarn fabrics offer considerable styling versatility when combined with cellulosic yarns including tone-on-tone, colored and white, and union effects since these microtape yarn fabrics exhibit excellent reservation to the dyestuffs used for dyeing the cellulosic yarn component. Dyeing procedures normally employed for cellulosic yarn with direct and vat colors provide very pleasing effects and highly desirable results.

Embossed fabrics of the instant microtape yarns provide pattern durability and offer increased style potential when employed in making the decorative sheeting material of the invention. Two inherent characteristics of these microtape yarns are utilized in embossing. (1) The thermoplastic nature of the filamentary microtape yarn permits the attainment of a durable embossed pattern. (2) The microporous structure of the microtape yarn yields to heat and pressure, thus resulting in a color contrast not generally obtainable with most other fibers or yarns. Thermostyling results in the transformation of plain fabrics into high style fabrics by embossing and is best obtained when the warp and filling yarns are of contrasting colors. Fabric design and construction are important considerations if a satisfactory emboss is to be obtained. Loosely constructed fabrics having considerable surface texture do not provide a good base fabric for embossing. Maximum permanency of emboss design is obtained on fabrics constructed of 100 percent of the instant microtape yarns. However, good durability is also obtained on combination fabrics of these microtapes combined with other yarns.

The manipulative steps of a suitable process comprise basically and generally of (1) coating an aqueous, latex-based, adhesive composition on the upper surface of a flexible, porous web substratum; (2) drying the adhesive coating on the upper surface of the so-treated web substratum; and (3) laminating a filamentary microtape fabric to the so-treated web substratum. The coating of the latex-based adhesive upon the web may be achieved by applying the latex to the web substratum by any of several known means which may be desired, such as spraying, doctoring, rolling, brushing, or similar technique.

It has been found, however, that with most of the webs (such as paper and fabrics), the web is so open as to permit complete diffusion and penetration therethrough. It is preferred, therefore, to coat the latex-based adhesive substantially on the surface of the web with only enough penetration of the web to achieve adequate adherence of the adhesive solids to prevent their easy removal through normal handling and storage operations.

It has been found that to achieve continuous adhesion and fusion, the dried polymer should be present on the flexible web in an amount by weight of from about 0.6 to about 1.6 ounces per square yard, preferably from about 0.6 to about 1.0 ounce per square yard. The required minimum coating weight will be dependent upon the specific gravity of the polymer used. Thus, with certain very light or very heavy polymers it may be possible to use less or more, respectively, of the polymer. The amount of polymer will also depend upon the coating thickness desired. With most flexible web materials it will be found desirable to have a dried adhesive coating of from about 0.002 to about 0.010 inch in thickness. When the thickness is appreciably less, there frequently will be found to be insufficient polymer for good bonding. A thickness of significantly more than 0.010 inch causes bleeding of the adhesive through the microtape yarn fabric during lamination. The actual amount of polymer to be deposited, therefore, may be varied within relatively wide limits. An investigator will be able to determine the desired weight by simple preliminary runs.

Following coating, the treated web is dried. The drying may be hastened by exposure to elevated temperatures of up to about 225° F., and preferably of from about 190° to 210° F., at atmospheric or subatmospheric pressures. The temperature should usually be kept below the softening temperature of the polymer or below the temperature of incipient fusion. However, where the treated web is to be shipped, stored, or handled considerably prior to lamination, it may be desirable to partially sinter the polymer to improve adherence to the web. The coating should not be completely fused, however, since no beneficial result is achieved by fusing the web prior to lamination and the web resulting from such fusion may be tacky or have a tendency to block and consequently be difficult to store on cores or in other conventional manner. Temperatures of from 190° F. to about 225° F. will usually be found to provide optimum drying conditions with most polymers, although higher or lower temperatures may be employed when desired. Even room temperature air drying may be used. Depending upon the character of the surface of the dried adhesive coatings on the porous web substrate, as explained heretofore, antiblocking agents may be dusted on or incorporated in the adhesive composition to eliminate any tendency of the dried adhesive coating to be undesirably tacky. The dried treated web may thus be stored for prolonged periods or may be used immediately in the subsequent laminating steps.

Lamination is achieved by bringing the dried treated web substratum into compressive pressure relationship with the desired fabric at an elevated temperature at which fusion of the adhesive coating is achieved. The required pressure may be imparted to the article with a two-roll calender stack having a heated lower roll. It is only necessary that sufficient pressure be applied to cause continuous adherence of the fused polymer at the temperature employed. It has been found that application of pressures of from about 500 to about 1200 pounds per square inch will suffice. The actual pressure required for optimum results will vary depending upon the polymer used, the thickness of the adhesive coating, the construction of the synthetic textile fabric being laminated to the adhesive coated web substrate, and the temperature employed. Within the above-stated pressure range, the temperature of the lower calender roll may be selected within the range of from about 200° F. to the softening point of the polymer and preferably from about 300° F. to 330° F., while the temperature of the upper roll is maintained at about 77° F.

The preferred means for causing lamination is passage of the fabric and coated substratum in contiguous relationship through the nip of a pair of calender rolls. Because the article is subjected to bonding conditions for a considerably shorter time, the temperatures and pressures required for lamination will almost always be appreciably higher than the corresponding conditions for a reciprocating press operation. Thus, temperatures of from about 200° F. to the softening point of the polymer may be used for the lower heated calender roll with the upper roll being generally held at about 77° F. with the gap width of the nip adjusted to secure complete fusion and adhesion upon passage of the elements therethrough.

The following examples are given for purposes of illustration.

EXAMPLE I

A 35 pounds/ream paper was knife coated with an aqueous, latex-based, adhesive composition composed of about 50 percent latex solids of an 85/15 vinylidene chloride-acrylonitrile copolymer containing 20 percent dibutyl phthalate plasticizer and formulated with about 50 weight percent of an aqueous dispersion of clay, obtained as "ASP-600." This aqueous clay dispersion was composed of about 500 parts of clay, about 3.0 parts of tetrasodium phosphate, and about 497 parts of water. About one ounce of the adhesive composition per square yard of paper was used to coat the paper substrate. The coated paper was subsequently air dried. The adhesive coated paper after drying was bonded to a synthetic textile fabric made from 400 denier microtapes with a plain 32 x 32 construction and weighing about 3.5 ounces per square yard. The 400 denier microtapes were prepared from electrolyte-coagulated, organic, thermoplastic, copolymer latex films composed of about 96 weight percent of interpolymerized vinylidene chloride and about 4 weight percent of interpolymerized acrylonitrile. The adhesive coated paper and synthetic textile fabric were passed between two laminating rolls under slight pressure. The roll in contact with the paper was maintained at a temperature of about 320° F., while the roll in contact with the fabric was maintained at a temperature of about 77° F. The lamina was passed between the bonding rolls at a surface speed of about 15 feet per minute.

A sample of this decorative sheeting was applied to the wainscoting of an office using wheat flour paste as the adhesive. Prior to the application of the decorative sheeting, the painted transite wall was washed with a solution of tetrasodium phosphate and subsequently primed with a dilute aqueous solution of a conventional animal glue-containing paint size composition. The application was very satisfactory.

EXAMPLE II

The purpose of this experimental run was to fabricate by means of conventional commercial-type procedures and commercial scale equipment decorative wall covering by laminating about 500 yards of the synthetic textile fabric, as described in Example I, to an equal amount of pouch paper (having a weight of 32 pounds per ream) using the organic, thermoplastic, latex adhesive composition of Example I as the binding component.

The latex-based adhesive composition was prepared by admixing about 250 grams of ammonium polyacrylate, obtained as "Acrysol GS," and about 500 grams of water to an aqueous dispersion containing about 26 pounds of an interpolymer latex composed of about 85 weight percent of vinylidene chloride, about 15 weight percent of acrylonitrile and about 20 weight percent as based on the weight of latex solids of dibutyl phthalate plasticizer.

The pouch paper was coated with the adhesive composition by means of a reverse roll paper coating machine at a rate of about 50 feet per minute. The amount of the coating deposited was estimated to be about one gallon of adhesive per 100 square yards of paper. The adhesive coated paper subsequently passed through an air circulating oven which was maintained at a temperature of about 200° F. The paper was dry to the touch as it was conveyed out of the oven and then it was passed through a set of laminating rolls with the synthetic textile fabric. The stainless steel roll on the paper side of the laminate was maintained at about 325° F. and a non-heated rubber roll having a Durameter hardness of 45 contacted the fabric. The laminated wall covering product then passed over several more unheated rolls so that it had time to cool before being collected on a receiving roll.

Adhesion of the fabric to the adhesive coated pouch paper appeared to be excellent as the laminated wall covering was conveyed from the rolls.

EXAMPLE III

About 500 yards of decorative laminated sheeting material suitable for use as a covering material for walls was prepared using (I) 38 pounds/ream paper stock produced from ground wood and commonly known in the trade as wallpaper stock or "hanging paper"; (II) a synthetic textile fabric made of 400 denier microtapes woven in a plain 32 x 32 fabric construction. The woven fabric weighed about 3.5 ounces per square yard. The 400 denier microtapes employed to weave the fabric were produced from electrolyte-coagulated, organic, thermoplastic, copolymer latex films composed of about 96 weight percent of interpolymerized vinylidene chloride and about 4 weight percent of interpolymerized ethyl acrylate; and (III) an adhesive composition comprising an aqueous dispersion containing about 47 weight percent latex solids of an organic, thermoplastic interpolymer composed of about 65 weight percent of ethyl acrylate, about 32 weight percent of methyl methacrylate, about 1.0 weight percent of acrylic acid, and about 1.0 weight percent of methacrylic acid, said acrylic latex dispersion having incorporated therein about 69 grams of ammonium polyacrylate, obtained as "Acrysol GS," per gallon of the latex dispersion. The adhesive composition, so described, had a viscosity of 45 seconds as determined on an efflux-type viscosimeter.

The paper was coated by means of a conventional reverse roll paper coating machine at a surface speed rate of from 50 feet per minute with an estimated coating deposition (i.e., add-on) of about one gallon of adhesive per 100 square yards of paper. The adhesive coated paper subsequently passed through a drying oven which was maintained at a temperature of about 205° F. and thence through the combining rolls where the fabric was introduced. The combining rolls consisted of a heated steel roll maintained at about 325° F. which, during the lamination process, contacted the uncoated surface of the adhesive coated paper web and an unheated 65 Durometer hardness rubber roll which contacted the non-adhering fabric surface. Suitable pressure was applied by weighting the rubber roll in order to assure adequate pressure to achieve complete lamination and a smooth fabric surface.

The decorative laminated sheeting, so produced, was thereafter trimmed to a handy, manageable width of 27 inches.

EXAMPLE IV

Employing the materials and procedures of Example III, about 500 yards of decorative lamina was prepared by coating paper, designated as 60 pound S. D. Warren paper, with the adhesive composition of Example III at a rate of about 36 feet per minute. The fabric which was subsequently laminated to the coated paper was a basket weave construction composed of toast color wrap microtape filaments and fill of the same color microtape filaments. During this run, the air circulating oven used to dry the adhesive coating was maintained at 175° F. In addition, when the basket weave fabric was fed with the coated paper through the laminating rolls, the weights on the continuous laminating press which regulate the pressure on the laminating rolls, were doubled. This was done in order to attain a greater surface smoothness.

Other types of decorative sheeting materials are prepared of synthetic textile fabrics of varying construction laminated to color pigmented and color printed papers having weights per ream of from 30 to about 60 pounds. A wide variety of color effects are possible in this way. Furthermore, additional variation in color effects can be provided by means of using color pigmented bonding agents (i.e., adhesives). Dyeing of the paper backing substrate after lamination may be achieved by passing the decorative sheeting materials through a dye bath or by painting the paper backing with a water-soluble dyestuff.

The decorative sheeting laminae produced in accordance with the invention have a widespread application in industry. For example, they are suitable for use in the interiors of buildings; the interiors of transportation vehicles; in luggage construction; as coverings for cabinets, cases, lamps, collapsible screens, accordion folding partitions; and as upholstery for furniture.

While the process and products herein described constitute preferred embodiments of the invention, it is to be understood that the invention is not limited to this precise process, and that changes may be made therein without departing from the scope of the invention which is defined in the appended claims.

What we claim is:

1. Decorative lamina comprising (A) a flexible, porous cellulosic substratum bonded to (B) a 200–1800 denier filamentary microtape textile fabric having a weight of 1 to 7 ounces per square yard, said microtape consisting of a normally crystalline polymeric material composed of at least 70 weight percent of polymerized vinylidene chloride, by (C) a moistureproof, organic, thermoplastic adhesive interlayer having a fusion temperature below about 330° F. and a thickness of about 0.002 to about 0.010 inch, wherein said adhesive interlayer is an interpolymer of at least two polymerizable unsaturated monomers, said interpolymer comprising at least 50 weight percent of a monomer selected from the group consisting of vinylidene chloride, alkyl and cycloalkyl acrylates and alkyl and cycloalkyl methacrylates and the balance of the weight of the interpolymer consists of at least one monomer selected from the group consisting of acrylonitrile, vinyl chloride, styrene monomers, acrylic acid, methacrylic acid, alkyl and cycloalkyl acrylates and alkyl and cycloalkyl methacrylates.

2. The lamina of claim 1, wherein said flexible, porous cellulosic substratum is paper sheeting having a weight of at least 10–50 pounds per ream.

3. The lamina of claim 1, wherein said filamentary microtape is a copolymer comprising from about 92 to about 99 weight percent of vinylidene chloride and from about 8 to about 1 weight percent of copolymerizable material selected from the group consisting of acrylonitrile and lower alkyl acrylates wherein the alkyl group contains from 1 to 8 carbon atoms.

4. The lamina of claim 1, wherein said adhesive interlayer is an interpolymer of vinylidene chloride and acrylonitrile.

5. The lamina of claim 1, wherein said adhesive interlayer is an interpolymer of ethyl acrylate, methyl methacrylate, acrylic acid and methacrylic acid.

References Cited
UNITED STATES PATENTS

| | | | |
|---|---|---|---|
| 2,070,527 | 2/1937 | Elmendorf | 161—89 |
| 2,572,877 | 10/1951 | Morris et al. | |
| 2,716,074 | 8/1955 | Mick et al. | 117—65 |
| 2,774,127 | 12/1956 | Secrist | 161—89 |
| 2,918,784 | 12/1959 | Faircloth | 57—167 |
| 2,949,394 | 8/1960 | Rodman | 161—82 |
| 2,960,725 | 11/1960 | Lefevre | 18—48 |
| 3,037,868 | 6/1962 | Rosser | 154—50 X |
| 3,048,510 | 8/1962 | Wisotsky | 161—413 |
| 3,108,017 | 10/1963 | Messwarb et al. | 260—29.6 |
| 3,144,425 | 8/1964 | Koch et al. | 260—29.6 |
| 3,240,742 | 3/1966 | Hahn et al. | 260—29.6 |

EARL M. BERGERT, *Primary Examiner.*

W. E. HOAG, *Assistant Examiner.*